US009646208B2

(12) United States Patent
Wu et al.

(10) Patent No.: US 9,646,208 B2
(45) Date of Patent: May 9, 2017

(54) METHOD FOR COMPUTERIZED GROUPING CONTACT LIST, ELECTRONIC DEVICE USING THE SAME AND COMPUTER PROGRAM PRODUCT

(71) Applicant: HTC Corporation, Taoyuan, Taoyuan County (TW)

(72) Inventors: Jui-Lin Wu, Taoyuan (TW); Tai-Ling Lu, Taoyuan (TW)

(73) Assignee: HTC CORPORATION, Taoyuan, Taoyuan County (TW)

(*) Notice: Subject to any disclaimer, the term of this patent is extended or adjusted under 35 U.S.C. 154(b) by 953 days.

(21) Appl. No.: 13/888,864

(22) Filed: May 7, 2013

(65) Prior Publication Data

US 2014/0337344 A1    Nov. 13, 2014

(51) Int. Cl.
*G06F 12/00* (2006.01)
*G06K 9/00* (2006.01)
*G06Q 10/10* (2012.01)
*G06Q 50/00* (2012.01)

(52) U.S. Cl.
CPC ......... *G06K 9/00677* (2013.01); *G06Q 10/10* (2013.01); *G06Q 50/01* (2013.01)

(58) Field of Classification Search
CPC ......... H04M 1/27455; G06F 17/30247; G06K 9/00221
USPC .......................................... 707/915; 382/118
See application file for complete search history.

(56) References Cited

U.S. PATENT DOCUMENTS

| 7,991,424 | B2 | 8/2011 | Batni et al. | |
| 2009/0006484 | A1* | 1/2009 | Wang | G06F 17/30247 |
| 2009/0274286 | A1 | 11/2009 | O'Shaughnessy et al. | |
| 2011/0038512 | A1* | 2/2011 | Petrou | G06F 17/30256 |
| | | | | 382/118 |
| 2011/0066743 | A1* | 3/2011 | Hurley | H04W 4/02 |
| | | | | 709/231 |
| 2012/0242840 | A1* | 9/2012 | Nakfour | G06K 9/6253 |
| | | | | 348/207.1 |
| 2013/0031061 | A1 | 1/2013 | Jagota | |
| 2013/0060604 | A1 | 3/2013 | Wright et al. | |
| 2013/0156275 | A1* | 6/2013 | Amacker | G06K 9/00677 |
| | | | | 382/118 |
| 2013/0287269 | A1* | 10/2013 | Gossweiler | G06K 9/62 |
| | | | | 382/118 |

FOREIGN PATENT DOCUMENTS

| CN | 101094262 A | 12/2007 |
| CN | 101465917 A | 6/2009 |
| CN | 101562649 A | 10/2009 |
| CN | 101799895 A | 8/2010 |
| CN | 102118510 A * | 3/2011 |
| CN | 102014203 A | 4/2011 |

(Continued)

*Primary Examiner* — Cheyne D Ly
(74) *Attorney, Agent, or Firm* — Rabin & Berdo, P.C.

(57) ABSTRACT

A method for computerized grouping contacts, an electronic device using the same and a computer program product are provided. The method for computerized grouping the contacts includes the following steps. At least one image is provided. Contacts are determined in the image. An interpersonal relation information is updated according to the image and the determined contacts. A contact group is suggested according to the interpersonal relation information.

16 Claims, 6 Drawing Sheets

(56) References Cited

FOREIGN PATENT DOCUMENTS

| | | |
|---|---|---|
| CN | 102118698 A | 7/2011 |
| CN | 102164197 A | 8/2011 |
| CN | 102340534 A | 2/2012 |
| CN | 102364471 A | 2/2012 |
| CN | 102780804 A | 11/2012 |
| CN | 101478592 B | 2/2013 |
| CN | 102930362 A | 2/2013 |
| TW | 201246902 A | 11/2012 |

* cited by examiner

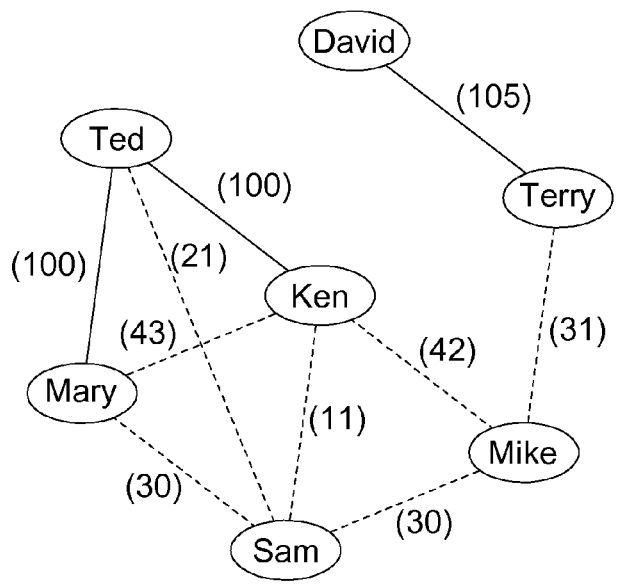
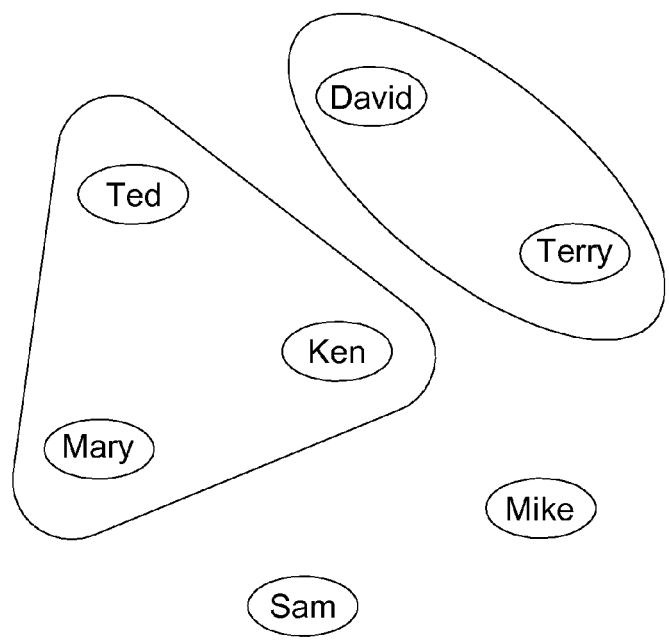
FIG. 5
FIG. 6

METHOD FOR COMPUTERIZED GROUPING CONTACT LIST, ELECTRONIC DEVICE USING THE SAME AND COMPUTER PROGRAM PRODUCT

BACKGROUND

Technical Field

The disclosed embodiments relate in general to a computerized processing method, an electronic device using the same, and a computer program product, and more particularly to a method for computerized grouping a contact list, an electronic device using the same, and a computer program product.

Description of the Related Art

With the development of technology, varied electronic devices are invented. For example, cell phone, tablet computer, and notebook computer are widely used in daily life. By using these devices, people can make a phone call or send messages to the other easily. These devices play an important role in human communication today. Those electronic devices usually have a contact list for keeping information of owner's friends. However, it is not easy to get the desired contact if there are too many entries in it. In addition, it's inconvenient to create contact groups which help us to organize contact information.

SUMMARY

The disclosure is directed to a method for computerized grouping a contact list, an electronic device using the same, and a computer program product. Varied information of an image is used for automatically computerized grouping the contact list, such that the electronic device can be friendly operated.

According to one embodiment, a method for computerized grouping a contact list is provided. The method for computerized grouping the contact list includes the following steps. At least one image is provided. Contacts in the image are determined. An interpersonal relation information is updated according to the image and the determined contacts. At least one contact group is provided for grouping the contact according to the interpersonal relation information.

According to another embodiment, an electronic device is provided. The electronic device includes an image acquisition unit, a relation processing unit and a group processing unit. The image acquisition unit is used for providing at least one image. The relation processing unit is used for determining contacts in the image and updating an interpersonal relation information according to the image and the determined contacts. The group processing unit is used for providing at least one contact group for grouping the contacts according to the interpersonal relation information.

According to another embodiment, a computer program product is provided. The computer program product is used for being loaded in an electronic device to perform a method for computerized grouping a contact list. The method for computerized grouping the contact list includes the following steps. At least one image is provided. Contacts in the image are determined. An interpersonal relation information is updated according to the image and the determined contacts. At least one contact group is provided for grouping the contacts according to the interpersonal relation information.

BRIEF DESCRIPTION OF THE DRAWINGS

FIG. 5 shows an updated interpersonal relation information.

FIG. 6 shows two contact groups

Figure 1:
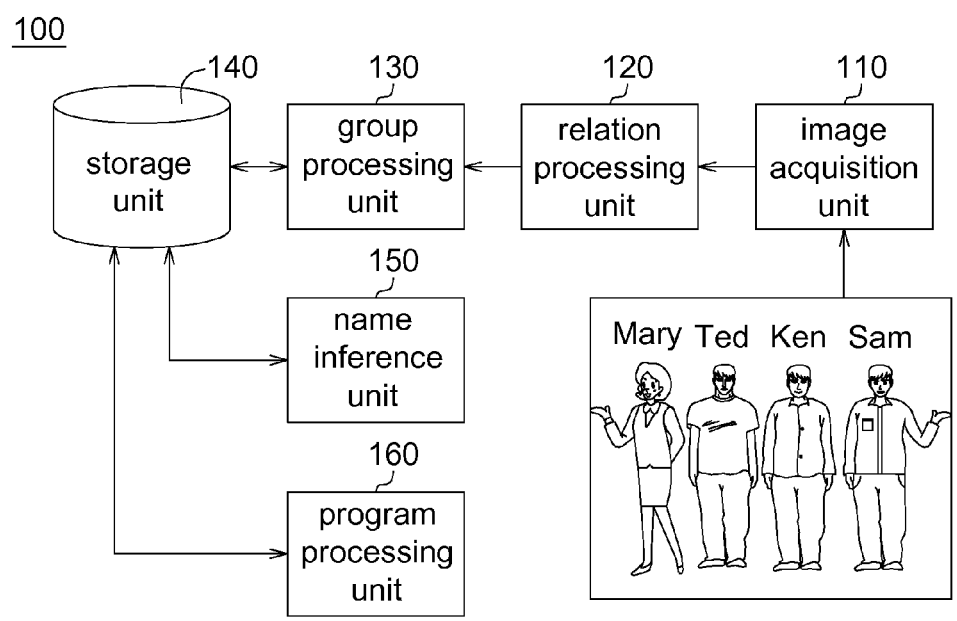
FIG. 1 shows an electronic device.

In the following detailed description, for purposes of explanation, numerous specific details are set forth in order to provide a thorough understanding of the disclosed embodiments. It will be apparent, however, that one or more embodiments may be practiced without these specific details.

In other instances, well-known structures and devices are schematically shown in order to simplify the drawing.

DETAILED DESCRIPTION

Preferred embodiments are disclosed below for elaborating the invention. Varied information of an image is used for automatically computerized grouping the contact list, such that the electronic device can be more user-friendly. The following embodiments are for the purpose of elaboration only, not for limiting the scope of protection of the invention. Besides, secondary elements are omitted in the following embodiments to highlight the technical features of the invention.

An electronic device 100 is shown in FIG. 1. For example, the electronic device 100 can be a smart phone, a tablet computer, a notebook computer, or a smart TV. The electronic device 100 at least includes an image acquisition unit 110, a relation processing unit 120, a group processing unit 130, and a storage unit 140. The image acquisition unit 110 is used for providing images P100. The input of the image acquisition unit 110 may be from a camera, a video recorder, a memory card, or an internet album. The relation processing unit 120 recognizes object and extract information of the image P100. The relation processing unit 120 and the group processing unit 130 are used for particular procedures. The relation processing unit 120 and the group processing unit 130 may be a processing chip, a circuit board, or a storage media storing a plurality of program codes. The storage unit 140 is used for storing varied data. The storage unit 140 may be a hard disk, a memory card, or a disk.

For illustrating the operation of the electronic device 100, a flowchart of a method for computerized grouping a contact list of the electronic device 100 is provided.

Figure 2:
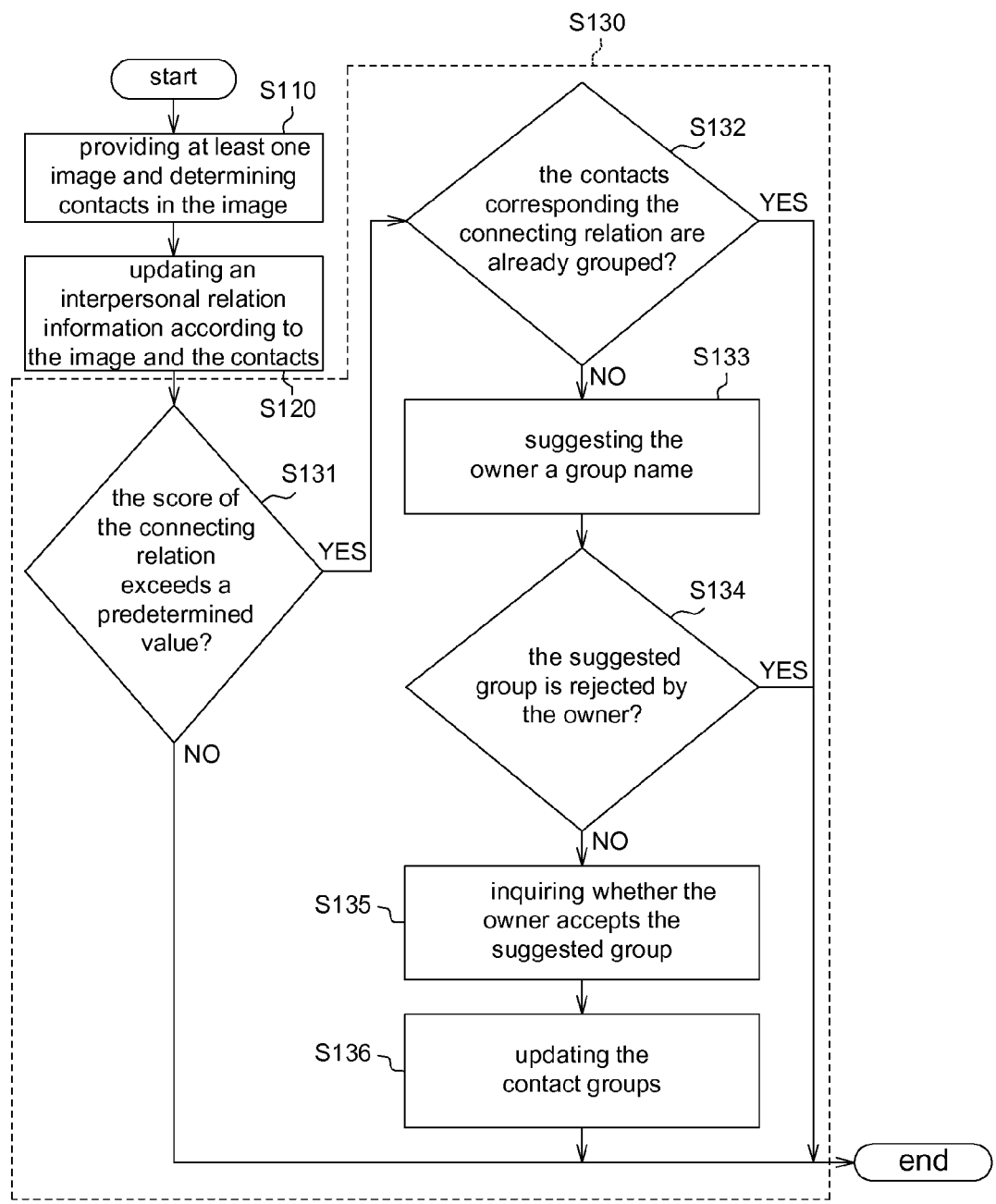
FIG. 2 shows a flowchart of a method for computerized grouping contacts.

Please referring to FIG. 2, the flowchart of the method for computerized grouping the contact list is shown. In step S110, the image acquisition unit 110 is used for providing images P100. The image P100 may include the owner of the electronic device 100 or not. Generally speaking, people in the image P100 are known to the owner. For example, the image P100 might be captured at abroad for sightseeing, or captured at working place for business, or captured at home for family. The people in the image P100 may be friends, colleagues, or family members of the owner.

The relation processing unit 120 can further recognize the people in the image P100. For example, the relation processing unit 120 can recognize the people in the image P100 via a face recognition technology. In one embodiment, the image P100 may be shown on a display, and then the owner may manually tag the people in the image P100. The recognized people in the image P100 may be the contacts already linked to the contact list, the instant message (IM) service, or the social network services, etc. As shown in table 1 below, the contact list stores the information of the seven people. As shown in FIG. 1, Ted, Ken, Mary, and Sam on the image P100 are recognized.

TABLE 1

| Name | Telephone No. | Address | Group |
|---|---|---|---|
| David | 0911-225-*** | Taipei | Classmate |
| Ken | 0922-225-*** | Washington, D.C. | |
| Mary | 0933-558-*** | Tokyo | |
| Mike | 0944-558-*** | New York | |
| Sam | 0936-555-*** | Kaohsiung | |
| Ted | 0354-888-*** | Taipei | |
| Terry | 0945-887-*** | Taipei | Classmate |

Figure 3:
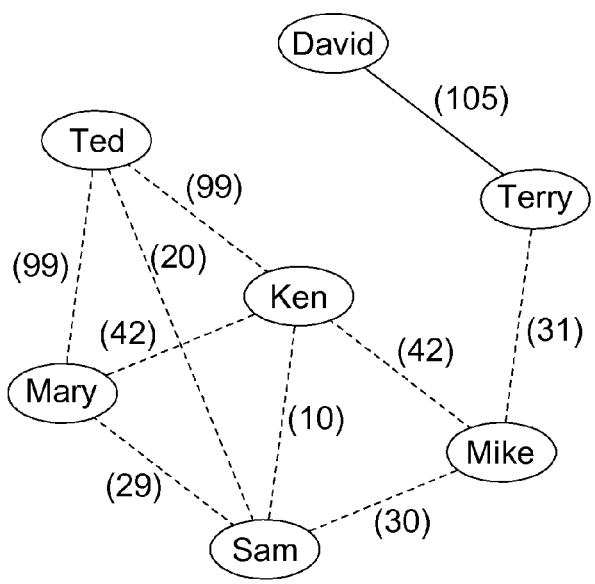
FIG. 3 shows an interpersonal relation information.

In step S120, the relation processing unit 120 updates an interpersonal relation information P200 (shown as FIG. 3) according to the image P100 and the determined contacts. Please referring to FIG. 3, the interpersonal relation information P200, which represents the interpersonal relation information among the seven contacts in a contact list, is shown. Among the seven contacts, some of the contacts have a connecting relation. For example, the score of the connecting relation between David and Terry is 105, the score of the connecting relation between Terry and Mike is 31, and the score of the connecting relation between Ted and Ken is 99. The contacts corresponding to the connecting relation whose score does not exceed a predetermined value is not able to form a group, so this connecting relation is represented by a dotted line. The contacts corresponding to the connecting relation whose score exceeds the predetermined value is suggested to form a group. This connecting relation is represented by a real line after the connecting relation is suggested and the owner confirms the connection relation.

Figure 4:
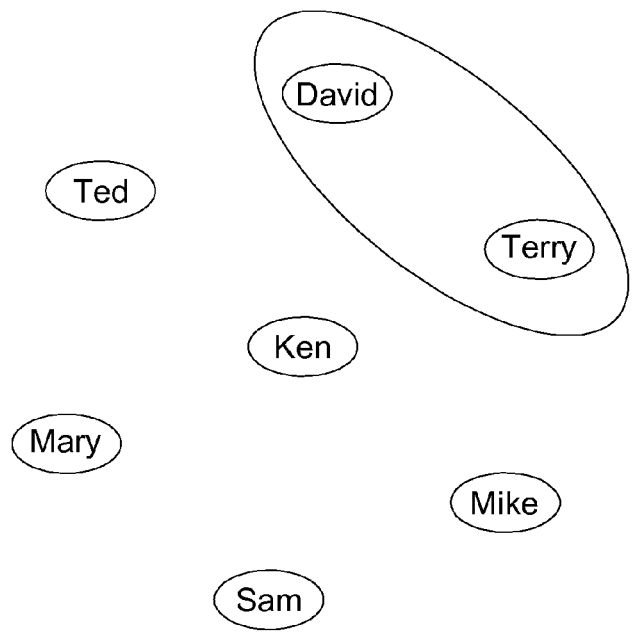
FIG. 4 shows one contact group.

Please referring to FIG. 4, one contact group is shown. Among the seven contacts, only the connecting relation between David and Terry is represented by a real line, so only David and Terry are grouped. As shown in table 1, David and Terry are grouped in a "Classmate" group.

In step S120, the relation processing unit 120 accumulates the scores of the connecting relations among the four contacts which are recognized. Please refer to FIGS. 3 and FIG. 5. FIG. 5 shows an updated interpersonal relation information P200'. For example, the score of the connecting relation between Ted and Ken is accumulated to 100, and the score of the connecting relation between Ken and Sam is accumulated to 11. In FIG. 5, the score of connecting relation between Ted and Ken is above 100, therefore, they might be in the same group, and a grouping suggestion is provided to the owner. Ted and Mary corresponding to the connecting relation which is accumulated to 100 may also be suggested to grouping Ted and Mary, so this connecting relation is represented by a real line if the grouping suggestion is confirmed by the owner.

In step S130, the group processing unit 130 suggests a new contact group according to the interpersonal relation information P200'. Please referring to FIGS. 4 and 6, FIG. 6 shows two contact groups. As the time goes by, we may find some connecting relations with high score in the interpersonal relation information P200'. For example, Ted and Ken, and Ted and Mary. Therefore, Ted, Ken, and Merry likely belong to the same group and the suggested group name is, for example, "Colleague". Table 2 shows the updated contact list which introduces a new group—Colleague.

TABLE 2

| Name | Telephone No. | Address | Group |
|---|---|---|---|
| David | 0911-225-*** | Taipei | Classmate |
| Ken | 0922-225-*** | Washington, D.C. | Colleague |
| Merry | 0933-558-*** | Tokyo | Colleague |
| Mike | 0944-558-*** | New York | |
| Sam | 0936-555-*** | Kaohsiung | |
| Ted | 0354-888-*** | Taipei | Colleague |
| Terry | 0945-887-*** | Taipei | Classmate |

The interpersonal relation information P200, P200' and the contact groups may be stored in the storage unit 140, and may be updated during the above procedure. The interpersonal map information P200, P200' and the contact groups can be stored in a matrix data structure or in a graph data structure.

As shown in FIG. 2, step S130 includes a plurality of sub-steps S131 to S136 and illustrates how the recommendation process runs. In step S131, whether the score of the connecting relation exceed a predetermined value is determined. If the score of the connecting relation exceeds the predetermined value, then the process is proceeded to step S132; if the score of the connecting relation does not exceed the predetermined value, then the process is terminated. The score of the connecting relation exceeds the predetermined value may be that the score of the connecting relation is more than or equal to the predetermined value; and the score of the connecting relation does not exceed the predetermined value may be that the score of the connecting relation is less than the predetermined value.

In step S132, whether the contacts corresponding to the connecting relation are already grouped is determined. If the contacts are already grouped, the process is terminated; otherwise, the process is proceeded to step S133.

Figure 7:
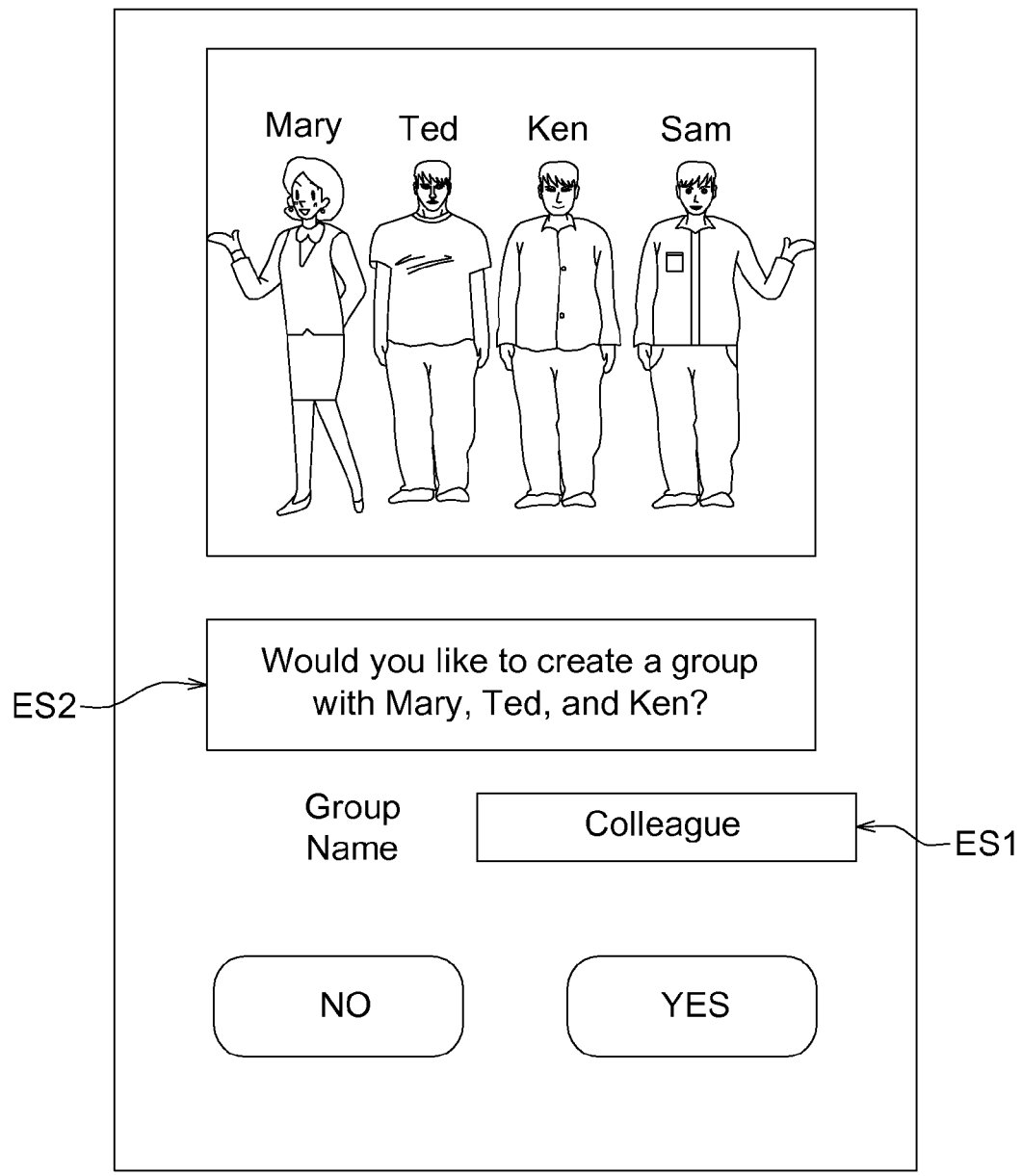
FIG. 7 shows an electronic message.
Figure 8:
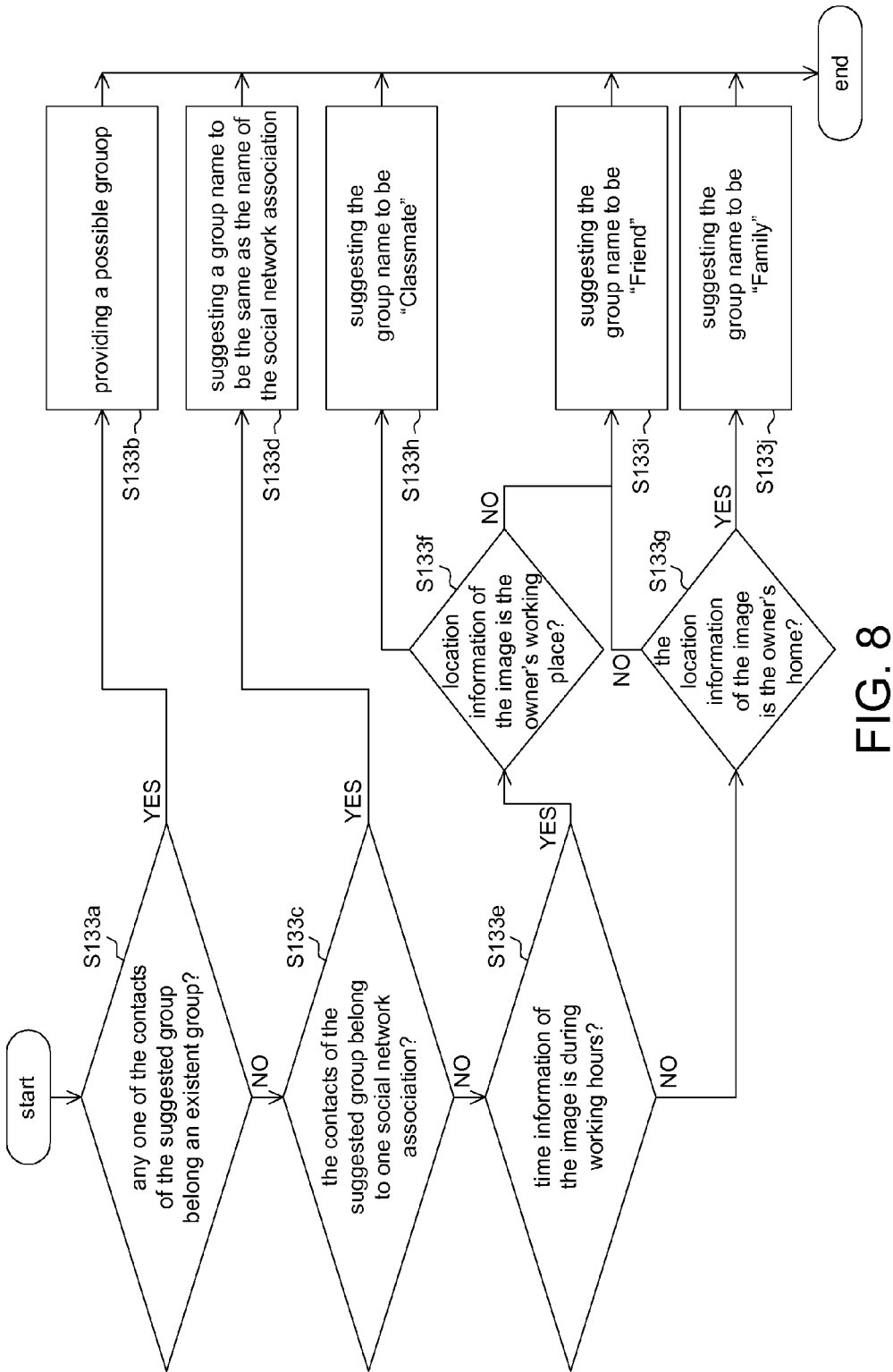
FIG. 8 shows a detail flowchart of the step S133.

In step S133, as shown in FIG. 7, an electronic message ES1 is shown on the display for suggesting the owner a group name. The suggested group name is generated according to the time and/or place information retrieved from the images. The detailed flow will be described in FIG. 8 below.

In step S134, whether the suggested group is ever rejected by the owner is determined. If the suggested group is not rejected by the owner, then the process is proceeded to the step S135; if the suggested group is rejected by the owner, then the process is terminated. In another embodiment, if the suggested group was proposed and rejected by the owner before, then the suggested group will not be proposed to the owner again when the score of the connecting relation exceeds the predetermined value after the rejection.

In step S135, as shown in FIG. 7, an electronic message ES2 is shown on the display for inquiring whether the owner accepts the suggested group.

In step S316, if the owner accepts the suggested group, then these contacts are grouped and the contact groups are updated. If the owner rejects these contacts to be grouped, then the rejection message is recorded to be a reference material for the step S134.

The sub-steps of the step S130 are performed in a cycle for each connecting relation until the process is already performed for all of the connecting relations.

In one embodiment, the electronic device 100 may further include a name inference unit 150. The name inference unit 150 is used for performed the step S133 above for suggesting the group name according to the retrieved information. The name inference unit 150 may be a processing chip, a circuit board, or a storage media storing a plurality of program codes.

For example, the step S133 may be performed by a plurality of sub-steps. Please referring to FIG. 8, a detail flowchart of the step S133 is shown. In step S133a, whether any one of the contacts of the suggested group belongs to an existent group is determined by the name inference unit 150. For example, a list of existing groups that include any of these people in the suggested group is provided. If the list is not empty, then the process is proceeded to step S133b; if the list is empty, then the process is proceeded to step S133c. In one embodiment, before step S133a, the method further comprises a step of whether the contacts of the suggested group are already grouped is determined. If the contacts are already grouped, the process will be terminated; if the contacts are not grouped, then the process is proceeded to step S133a.

In step S133b, a possible group is provided. For example, as shown in FIG. 4, assume the score of the connecting relation between Terry and Mike exceeds the predetermined value, and Terry is already in a group named "Classmate." Since Mike is close to Terry, Mike is likely in the group "Classmate", too. Therefore, the group "Classmate" is suggested. If Terry belongs to only one group "Classmate," then only the group "Classmate" is suggested; if Terry belongs to multiple groups, then a list of the multiple groups is proposed to the owner. In one embodiment, the suggested group name may be edited by the owner. For example, the owner may change the original name "Classmate" after the owner select the group "Classmate" from the suggested list.

In one embodiment, the social network service information may be used for the suggestion of group name. For example, in step S133c, whether the contact of the suggested group belongs to one social network association is determined by the name inference unit 150. If all or most of the contacts of the suggested group belong to some social network association, then the process is proceeded to step S133d; if the contacts of the suggested group do not belong to any social network association, then the process is proceeded to step S133e.

In step S133d, a group name is suggested to be the same as the name of the social network association by the name inference unit 150. For example, as shown in FIG. 4, if Ken and Mike are suggested to be grouped, Ken and Mike belong to "Climber" association in Facebook; then the group name thereof can be suggested to be "Climber."

In another embodiment, the time information of the image may be retrieved and used for the suggestion of the group name. For example, in step S133e, whether capture time of the image P100 is during working hours is determined by the name inference unit 150. If the time of taking the image P100 is during working hours, the process is proceeded to step S133f; otherwise, the process is proceeded to step S133g. The working hours may be inferred by using the time and location information of the electronic device 100. Alternatively, the owner may directly input the working hours information to the electronic device 100.

In another embodiment, the location information of the image P100 may be retrieved and used for the suggestion of the group name. The location information of the image P100 will be determined if it is corresponding to a specific location, where the specific location may be, for example, the owners office, school, etc. For example, in step S133f, whether location information of the image P100 is the owner's working place is determined by the name inference unit 150. The working place may be, for example, the owner's office, school, etc. If the location information indicates that the image P100 is created at the working place, the process is proceeded to step S133h; if the location information in the image P100 is not the working place, the process is proceeded to S133i.

For another example, in step S133g, whether the location information of the image P100 is the owner's home is determined by the name inference unit 150. If the location information indicates that the image P100 is the owner's home, then the process is proceeded to S133j; otherwise, the process is proceeded to step S133i.

In step S133h, the group name is suggested to be "Colleague" by the name inference unit 150 if the working place is an office. The suggested group name may be "Classmate" if the working place is a school.

In step S133i, the group name is suggested to be "Friend" by the name inference unit 150. In one embodiment, the suggested name may be "Friend."

In step S133j, the group name is suggested to be "Family" by the name inference unit 150.

That is to say, if the time information is the owner's working hours and the location information is the owner's office, then the group name is suggested to be "Colleague"; if the time information is the owner's working hours and the location information is not the owner's office, then the group name is suggested to be "Friend"; if the time information is not the owner's working hours and the location information is not the owner's home, then the group name is suggested to be "Friend"; if the time information is not the owner's working hours and the location information is the owner's home, then the group name is suggested to be "Family."

Base on above, as shown in FIG. 7, electronic message ES2 which suggests the owner to modify group settings and displays which people in the interpersonal relation information P200' can be grouped, and the electronic message ES1 can provide a suggestion for the group name.

In one embodiment, the electronic device 100 further includes a program processing unit 160. The program processing unit 160 is used for providing some further suggestions while an application program is running. The program processing unit 160 may be a processing chip, a circuit board, or a storage media storing a plurality of program codes.

In one embodiment, when the owner wants to send a message through an email application, an instant message (IM) application, or a chat room application, etc., the program processing unit 160 can suggest a next message receiver according to the contact groups after the user selects or inputs the first receiver. For example, the owner selects David as the first message receiver, the program processing unit 160 can suggest Terry to be the next receiver.

In one embodiment, when the owner is editing a mail, the program processing unit 160 can suggest a mail receiver list according to the contact groups. For example, when the owner chose Ken to be a receiver, then the program processing unit 160 can suggest Ted and Mary to be the receivers too. Also, when the owner is using an IM application or a chat room application, the program processing unit 160 can suggest a message receiver list or a chat room participant list, respectively.

In one embodiment, when the owner is creating a chat room, the program processing unit 160 can suggest a chat room list according to the contact groups. For example, when the owner created a chat room with Mary, then the program processing unit 160 can suggest Ted and Ken to be added into the chat room.

In one embodiment, the confirmed relationship could be a reference for recommendation. For example, the owner would like to plan an event in his calendar. If he has select one people as attendee, its likely to pick contacts of the group which the selected attendee belongs to.

Base on above, several embodiments are disclosed above for elaborating the invention. Explicit and implicit information of an image is used for automatically computerized grouping the contact list, and some suggestions can be provided according to the interpersonal relation information when the application program is performed, such that the electronic device can be friendly operated.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for grouping contacts, comprising:
providing at least one image by an image acquisition unit;
recognizing contacts in the image by a relation processing unit according to contact information from one or more of a contact list, an instant message (IM) service, and social network services;
determining a score of a connecting relation among the contacts recognized by the relation processing unit;
updating, by the relation processing unit, interpersonal relation information of the recognized contacts by incrementing the score of the connecting relation among the contacts recognized in the image by the relation processing unit; and
in response to determining that the incremented score of the connecting relation between at least two of the recognized contacts exceeds a predetermined value, providing, by a group processing unit, at least one contact group for grouping the at least two recognized contacts according to the interpersonal relation information, wherein a group name of the provided contact group is suggested according to information from the social network services; and
in response to the recognized contacts grouped in the provided group, adding the recognized contacts into a list for the provided group.

2. The method according to claim 1, wherein the image comprises time information, and the method further comprises:
providing a group name according to the time information.

3. The method according to claim 1, wherein the image comprises location information, and the method further comprises:
providing a group name according to the location information.

4. The method according to claim 1, wherein the contact group comprising group information, and the method further comprises:
suggesting a message receiver list according to the group information.

5. The method according to claim 1, wherein the contact group comprises group information, and the method further comprises:
providing a mail receiver list according to the group information.

6. The method according to claim 1, wherein the contact group comprises group information, and the method further comprises:
providing a chat room participant list according to the group information.

7. The method according to claim 1, wherein the contact group comprises group information, and the method further comprises:
providing attendee of a planned event according to the interpersonal relation information.

8. An electronic device, comprising:
an image acquisition unit, used for providing at least one image;
a relation processing unit, used for recognizing contacts in the image according to contact information from one or more of a contact list, an instant message (IM) service, and social network services, determining a score of a connecting relation among the contacts recognized by the relation processing unit and updating interpersonal relation information of the recognized contacts by incrementing the score of the connecting relation among the contacts recognized in the image; and
a group processing unit, used for providing a contact group for grouping the at least two of the recognized contacts according to the interpersonal relation information in response to determining that the incremented score of the connecting relation between the at least two of the recognized contacts exceeds a predetermined value, wherein a group name of the provided contact group is suggested according to information from the social network services, and for adding the recognized contacts into a list for the provided group in response to the recognized contacts grouped in the provided group.

9. The electronic device according to claim 8, wherein the image comprises time information, and the electronic device further comprises:
a name inference unit, used for providing a group name according to the time information.

10. The electronic device according to claim 8, wherein the image comprises location information, and the electronic device further comprises:
a name inference unit, used for providing a group name according to the location information.

11. The electronic device according to claim 8, further comprising:
a program processing unit, used for providing a message receiver list according to group information of the contact group.

12. The electronic device according to claim 8, further comprising:
a program processing unit, used for providing a mail receiver list according to group information of the contact group.

13. The electronic device according to claim 8, further comprising:
a program processing unit, used for providing a chat room participant list according to group information of the contact group.

14. The electronic device according to claim 8, further comprising:
a program processing unit, used for recommending attendee of a planned event according to group information of the contact group.

15. The electronic device according to claim 8, wherein the electronic device is a smart phone, a tablet computer, a notebook computer, or a smart TV.

16. A non-transitory computer program product, used for being loaded in an electronic device to perform a method for grouping contacts, comprising:
providing at least one image;
recognizing contacts in the image according to contact information from one or more of a contact list, an instant message (IM) service, and social network services;

determining a score of a connecting relation among the contacts recognized by the relation processing unit;

updating interpersonal relation information of the recognized contacts by incrementing the score of the connecting relation among the contacts recognized in the image by the relation processing unit; and in response to determining that the incremented score of the connecting relation between at least two of the recognized contacts exceeds a predetermined value, providing at least one contact group for grouping the at least two recognized contacts according to the interpersonal relation information, wherein a group name of the provided contact group is suggested according to information from the social network services; and in response to the recognized contacts grouped in the provided group, adding the recognized contacts into a list for the provided group.

* * * * *